United States Patent
Levijoki et al.

(10) Patent No.: US 10,287,994 B2
(45) Date of Patent: May 14, 2019

(54) ELECTRONIC THROTTLE CONTROL USING MODEL PREDICTIVE CONTROL

(71) Applicant: GM Global Technology Operations LLC, Detroit, MI (US)

(72) Inventors: Stephen P. Levijoki, Swartz Creek, MI (US); Bin Xu, Canton, MI (US); Gionata Cimini, Castelraimondo (IT)

(*) Notice: Subject to any disclaimer, the term of this patent is extended or adjusted under 35 U.S.C. 154(b) by 0 days.

(21) Appl. No.: 15/594,176

(22) Filed: May 12, 2017

(65) Prior Publication Data
US 2018/0328294 A1    Nov. 15, 2018

(51) Int. Cl.
| F02D 41/00 | (2006.01) |
| F02D 11/10 | (2006.01) |
| F02D 41/14 | (2006.01) |
| G05B 13/04 | (2006.01) |
| F02D 41/30 | (2006.01) |

(52) U.S. Cl.
CPC ............ F02D 11/105 (2013.01); F02D 11/10 (2013.01); F02D 41/0002 (2013.01); F02D 41/1406 (2013.01); G05B 13/048 (2013.01); F02D 41/30 (2013.01); F02D 2041/142 (2013.01); F02D 2041/1412 (2013.01); F02D 2041/1413 (2013.01); F02D 2041/1417 (2013.01); F02D 2041/1418 (2013.01); F02D 2041/1423 (2013.01); F02D 2041/1431 (2013.01); F02D 2041/1433 (2013.01)

(58) Field of Classification Search
CPC ..... F02D 2041/1412; F02D 2041/1413; F02D 2041/1417; F02D 2041/142; F02D 2041/1423; F02D 2041/143; F02D 2041/1431; F02D 2041/1433; F02D 11/105
See application file for complete search history.

(56) References Cited

U.S. PATENT DOCUMENTS

| 5,927,251 A * | 7/1999 | Watanabe ............. F02D 11/107 123/399 |
| 6,109,239 A * | 8/2000 | Watanabe ............. F02D 11/106 123/396 |
| 6,470,259 B1 * | 10/2002 | Round ................. F02D 11/107 123/397 |
| 7,822,516 B2 * | 10/2010 | Yanaka ................. B60W 50/02 340/438 |
| 9,121,361 B2 * | 9/2015 | Shimizu ............. F01L 13/0026 |
| 9,347,381 B2 | 5/2016 | Long et al. |

(Continued)

*Primary Examiner* — Sizo B Vilakazi
*Assistant Examiner* — Kevin R Steckbauer (57) ABSTRACT

A vehicle throttle control system includes a torque control system providing a desired torque for a throttle valve. A conversion module converts the desired torque to a desired throttle area and converts the desired throttle area to a target throttle position. A selection module determines which one of multiple MPC controllers should be used based on a current position of the throttle valve. A prediction module determines future state values using a mathematical model of a throttle body. A cost module determines a first cost for a first set of MPC target throttle duty cycle values. A control module identifies optimal sets of target throttle motor duty cycle values for each of the MPC controllers. The multiple MPC controllers control operation of a throttle valve duty cycle to achieve a target throttle opening area based on a first one of the target throttle motor duty cycle values.

16 Claims, 5 Drawing Sheets

(56) References Cited

U.S. PATENT DOCUMENTS

| | | | |
|---|---|---|---|
| 9,388,758 B2 | 7/2016 | Pochner et al. | |
| 9,399,959 B2* | 7/2016 | Whitney | F02D 41/222 |
| 9,581,094 B2* | 2/2017 | Saito | F02D 41/307 |
| 9,599,053 B2 | 3/2017 | Long et al. | |
| 9,605,615 B2* | 3/2017 | Long | F02D 41/045 |
| 9,714,616 B2* | 7/2017 | Jin | F02D 28/00 |
| 9,771,883 B1* | 9/2017 | Haskara | F02D 41/0002 |
| 9,784,198 B2* | 10/2017 | Long | F02D 41/0077 |
| 2003/0145836 A1* | 8/2003 | Linna | F02B 1/12 |
| | | | 123/501 |
| 2012/0185145 A1* | 7/2012 | Feuchter | G05B 19/0428 |
| | | | 701/101 |
| 2015/0275784 A1* | 10/2015 | Whitney | F02D 13/02 |
| | | | 701/102 |
| 2015/0275786 A1* | 10/2015 | Jin | F02D 28/00 |
| | | | 701/102 |
| 2016/0123253 A1* | 5/2016 | Saito | F02D 41/307 |
| | | | 123/406.23 |
| 2016/0237927 A1* | 8/2016 | Long | F02D 41/0077 |
| 2016/0237932 A1* | 8/2016 | Long | F02D 41/045 |
| 2017/0276074 A1* | 9/2017 | Haskara | F02D 41/0002 |

* cited by examiner

ELECTRONIC THROTTLE CONTROL USING MODEL PREDICTIVE CONTROL

INTRODUCTION

The present disclosure relates to electric motors and more particularly to electronic throttle body control systems and methods for vehicles.

Internal combustion engines combust an air and fuel mixture within cylinders to drive pistons, which produces drive torque. Air flow into the engine is regulated via a throttle. The throttle adjusts a throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Electronic throttle control systems have been developed to control a throttle valve position or area to achieve a desired torque. Many of these valves are motor actuated blade or butterfly valves having a valve default position which is a balance point of opposed mechanical springs that bias the valve blade. Known electronic throttle control systems use a single proportional-integral-derivative (PID) controller to induce motor operation. The mechanical spring system or other throttle body design attributes can induce non-linear characteristics into the throttle positioning, particularly in the area around the valve default position, versus areas away from the default position. These different areas cannot currently be optimally tuned by one PID controller. This can result in valve oscillations which can cause airflow and torque oscillations in the engine. Traditional electronic throttle control systems therefore do not control the throttle position as accurately as desired, and do not provide a rapid response to control signals.

Thus, while current electronic throttle control systems achieve their intended purpose, there is a need for a new and improved system and method for electronically controlling a throttle systems.

SUMMARY

According to several aspects, a throttle control system for a vehicle includes a model predictive control (MPC) module with multiple MPC controllers which are selected using a selection module.

In an additional aspect of the present disclosure, the multiple MPC controllers include at least a first MPC controller and a second MPC controller, the selection module selecting one of the first MPC controller or the second MPC controller based on a current operating position of a throttle valve; and at least one of the first MPC controller or the second MPC controller controls operation of a throttle valve motor duty cycle to achieve a target throttle valve position based on a first one of multiple control action values.

In another aspect of the present disclosure, a prediction module determines future state values of a throttle motor system based on an actual throttle valve position.

In another aspect of the present disclosure, the prediction module determines the future state values of the throttle motor system based on a mathematical model of a throttle body.

In another aspect of the present disclosure, the prediction module further includes measured disturbances within the mathematical model.

In another aspect of the present disclosure, a constraint module sets constraints for each of an output throttle position, a throttle motor input duty cycle and a throttle motor input duty cycle rate change.

In another aspect of the present disclosure, the constraint module adjusts the constraints to narrow an operational range for an electric motor control parameter when a fault is diagnosed in an electric motor operating the throttle valve.

In another aspect of the present disclosure, each of the multiple MPC controllers includes: a Kalman filter; and a quadratic programming problem solver.

In another aspect of the present disclosure, the quadratic programming problem is different for each of the MPC controllers.

In another aspect of the present disclosure, the Kalman filter is different for each of the MPC controllers.

In another aspect of the present disclosure, the at least one MPC controller system includes: a first MPC control module that controls a throttle valve proximate to a range of a throttle balance point of the throttle valve; and a second MPC control module that controls the throttle valve outside of the range of the throttle balance point.

In another aspect of the present disclosure, a torque control module generates a target engine torque; and converts the desired engine torque into a target throttle opening area.

In another aspect of the present disclosure, a conversion module converts the target throttle opening area into a target throttle position; and converts the target throttle position into a target duty cycle.

According to several aspects, a method for controlling a vehicle throttle valve duty cycle using model predictive control (MPC) comprises: determining a first MPC module to use based on a current position of a throttle valve; determining current constraints; and optimizing a cost function for a set of throttle valve duty cycle values for controlling the position of the throttle valve.

In another aspect of the present disclosure, the method includes: identifying sets of the throttle motor duty cycle values based on the throttle valve position; and determining predicted future state values of a throttle motor system for each of the sets of the throttle motor duty cycle values based on each set throttle duty cycle target values and a mathematical model of a throttle body.

In another aspect of the present disclosure, the method includes setting at least one constraint for at least one of the throttle motor duty cycle values; and selecting one of multiple future control actions having a lowest cost which satisfies the at least one constraint.

In another aspect of the present disclosure, the method includes: predicting the future throttle motor control system states using a Kalman filter; calculating the target throttle motor duty cycle values using a quadratic programming (QP) solver; generating output reference values from the high level torque system for a desired throttle valve position; and applying a first controller to control the throttle valve proximate to a range of a throttle balance point of the throttle valve; and actuating a second controller to control the throttle valve outside of the range of the throttle balance point.

According to several aspects, a throttle control system for a vehicle comprises: a torque control system that provides a desired torque; a conversion module that converts the desired torque to a desired throttle area; a conversion module that converts the desired throttle area to a target throttle position; a selection module that determines which one of multiple model predictive control (MPC) controllers should be used based on a current position of the throttle valve; a prediction module that: determines future state values of the throttle control system using a mathematical model of a throttle body; a cost module that determines a first cost for a first possible set of MPC target throttle duty cycle values; a control module that identifies optimal sets of possible target throttle motor duty cycle values for each of the MPC controllers; the MPC controllers control operation of a throttle valve duty cycle to achieve a target throttle opening area based on a first one of the target values from the system level control.

In another aspect of the present disclosure, the at least one MPC controller includes: a first controller having a Kalman filter and a quadratic programming (QP) solver which solves a quadratic programming problem, the first controller controlling the throttle valve proximate to a range of a throttle balance point of the throttle valve; and a second controller having a Kalman filter and a quadratic programming (QP) solver which solves a quadratic programming problem, the second controller controlling the throttle valve outside of the range of the throttle balance point.

In another aspect of the present disclosure, a constraint module sets constraints for each of the target throttle motor duty cycle values.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

An electronic throttle position control module of the present disclosure generates throttle target values using model predictive control (MPC). More specifically, the electronic throttle position control module identifies possible sets of throttle target values based on an electronic throttle position. The electronic throttle position control module determines predicted parameters for each of the possible sets based on the possible sets' target values and a mathematical model of the throttle body. For example, the electronic throttle position control module determines a predicted electronic throttle position for each of the possible sets of target values. The electronic throttle position control module also determines a cost associated with use of each of the possible sets. The cost determined for a possible set increases as a magnitude of a first difference between the predicted electronic throttle position determined for that possible set and as the predicted electronic throttle position request increases and vice versa.

The electronic throttle position control module selects one of the possible sets having the lowest cost. In this manner, the electronic throttle position control module may select the one of the possible sets that is predicted to most closely track the electronic throttle position request while minimizing a position error. Minimizing the position error minimizes overshoot and settling time. The electronic throttle position control module therefore sets the target values for controlling the electronic throttle position using the target values of the selected possible set.

Figure 1:
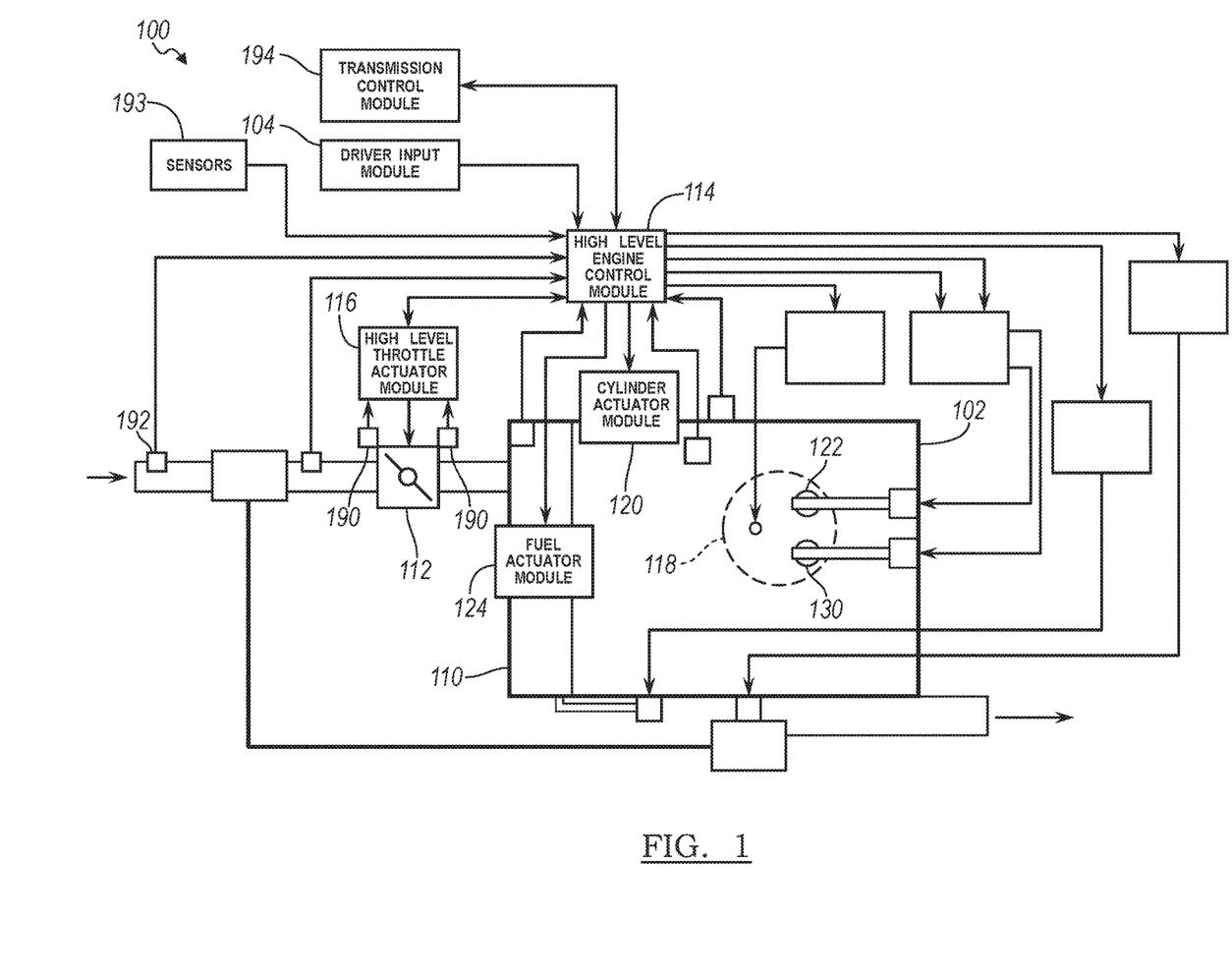
FIG. 1 is a functional block diagram of an engine system according to an exemplary embodiment.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, the throttle valve 112 may include a butterfly valve having a rotatable blade. A high level engine control module (ECM) 114 controls a high level throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The high level ECM 114 may instruct a cylinder actuator module 120 to provide fuel to all of the cylinders, or may selectively deactivate some of the cylinders, which can improve fuel economy under certain engine operating conditions.

The engine 102 may operate using a four-stroke cycle. The four strokes, described below, are an intake stroke, a compression stroke, a combustion stroke, and an exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The high level ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 will halt injection of fuel to cylinders that are selected for deactivation.

The high level throttle actuator module 116 monitors the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193. The high level ECM 114 uses signals from the throttle position sensors (TPS) 190 to make control decisions for the engine system 100. The high level ECM 114 may also communicate with a transmission control module 194 to coordinate shifting gears in a transmission (not shown).

Each system that varies an engine parameter may be referred to as an engine actuator. For example, the high level throttle actuator module 116 adjusts opening of the throttle valve 112 to achieve a target throttle opening area. The high level ECM 114 generates target values for the electronic throttle position which causes the electronic throttle to generate a target electronic throttle position. The high level ECM 114 generates the target values for the electronic throttle using model predictive control (MPC), as discussed further below.

Figure 2:
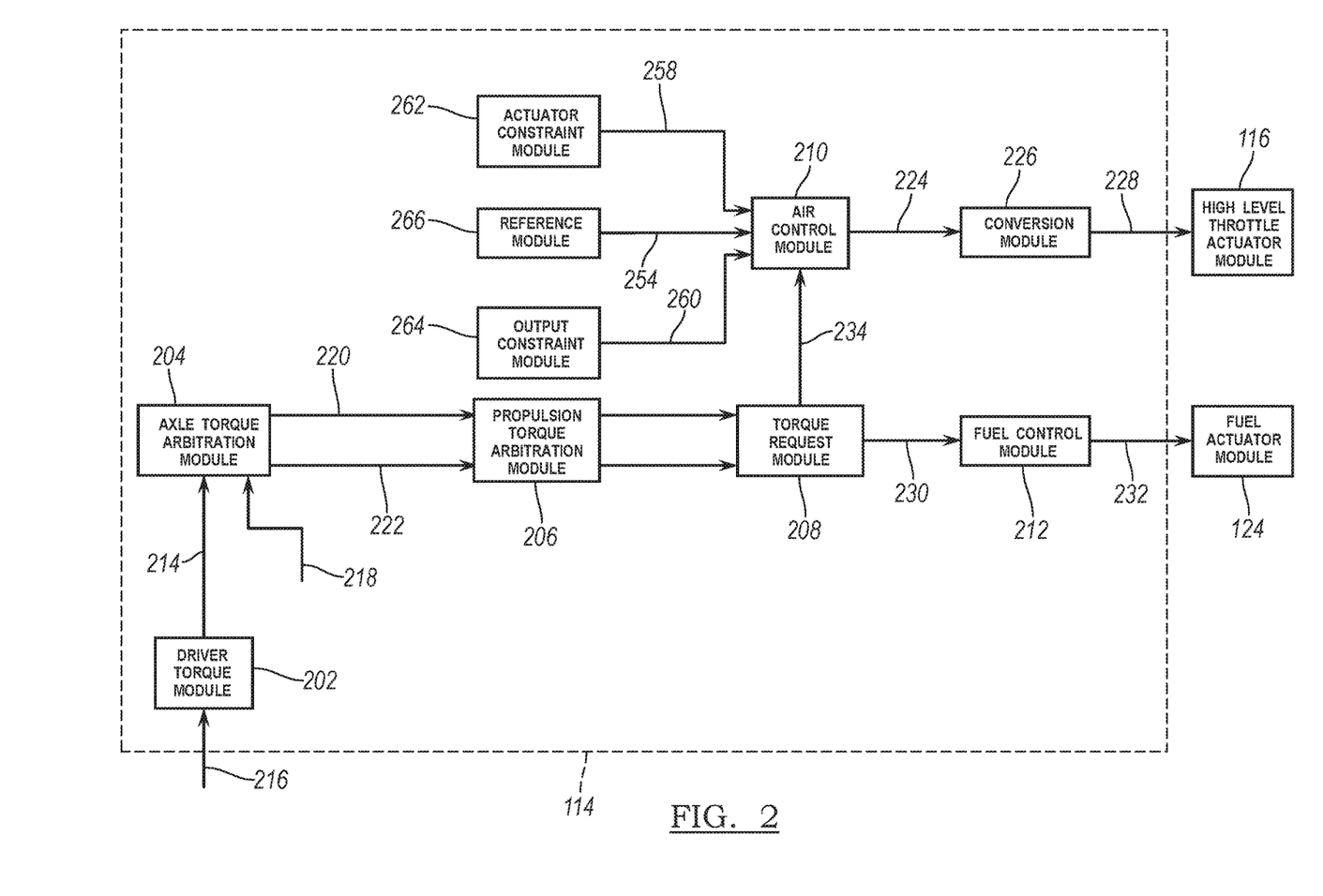
FIG. 2 is a functional block diagram of a high level MPC throttle control system according to an exemplary embodiment.

Referring to FIG. 2, a functional block diagram of an example high level engine control system (ECM) 114 is presented. The example implementation of the ECM 114 includes a driver torque module 202, an axle torque arbitration module 204, and a propulsion torque arbitration module 206. The ECM 114 also includes a torque request module 208, an air control module 210, and a fuel control module 212.

The driver torque module 202 determines a driver torque request 214 based on a driver input 216 from the driver input module 104. The driver input 216 may be based on, for example, a position of an accelerator pedal and a position of a brake pedal.

The axle torque arbitration module 204 arbitrates between the driver torque request 214 and other axle torque requests 218. Axle torque (torque at the wheels) may be produced by various sources including an engine and/or an electric motor.

The axle torque arbitration module 204 outputs each of a predicted torque request 220 and an immediate torque request 222 based on the results of arbitrating between the received driver torque requests 214 and the other torque requests 218. As described below, the predicted torque request 220 and the immediate torque request 222 from the axle torque arbitration module 204 may selectively be adjusted by other modules of the ECM 114 before being used to control the engine actuators.

The high level throttle actuator module 116 changes the throttle opening by adjusting an angle of the blade of the throttle valve 112. Therefore, when the target value for opening of the throttle valve 112 is changed, there is a mechanical delay as the throttle valve 112 moves from its previous position to a new position in response to the directed change. In addition, air flow changes based on the throttle opening are subject to air transport delays in the intake manifold 110. Further, increased air flow in the intake manifold 110 is delayed and not realized as an increase in engine output torque until the cylinder 118 receives additional air in the next intake stroke, compresses the additional air, and commences the combustion stroke.

Because of the delays inherent in the above operation, the high level throttle actuator module 116 controls the throttle valve 112 to achieve a target throttle opening area defining a target throttle position value 224. To achieve a higher degree of control, a conversion module 226 may convert the target throttle opening area or target position value 224 into a target duty cycle 228 using a second model predictive control system discussed below to be applied to the throttle valve 112, and the high level throttle actuator module 116 applies a signal to the throttle valve 112 based on the target duty cycle 228. In various implementations, the conversion module 226 converts the target throttle position value 224 shown in reference to FIG. 5 into a target throttle position, and converts the target throttle position into the target duty cycle 228. In determining the target duty cycle 228, throttle body temperature which may be determined using a sensor or correlated to an ambient temperature, and a throttle voltage will be identified as measured disturbances.

The fuel control module 212 varies the amount of fuel provided to each cylinder based on a fuel torque request 230. More specifically, the fuel control module 212 generates target fueling parameters 232 based on the fuel torque request 230. The target fueling parameters 232 may include, for example, target mass of fuel, target injection starting timing, and target number of fuel injections.

During normal operation, the fuel control module 212 may operate in an air lead mode in which the fuel control module 212 attempts to maintain a stoichiometric air/fuel ratio by controlling fueling based on air flow. In the air lead mode the fuel control module 212 determines a target fuel mass that will yield stoichiometric combustion when combined with a present mass of air per cylinder (APC).

Referring to FIG. 3 and again to FIGS. 1 and 2, a functional block diagram is presented of an example implementation of the air control module 210 applying the second model predictive control system. An air torque request 234 from the torque request module 208 may be a brake torque. A torque conversion module 235 converts the air torque request 234 from brake torque into base torque. The torque request resulting from conversion into base torque will be referred to as a base air torque request 236.

Figure 3:
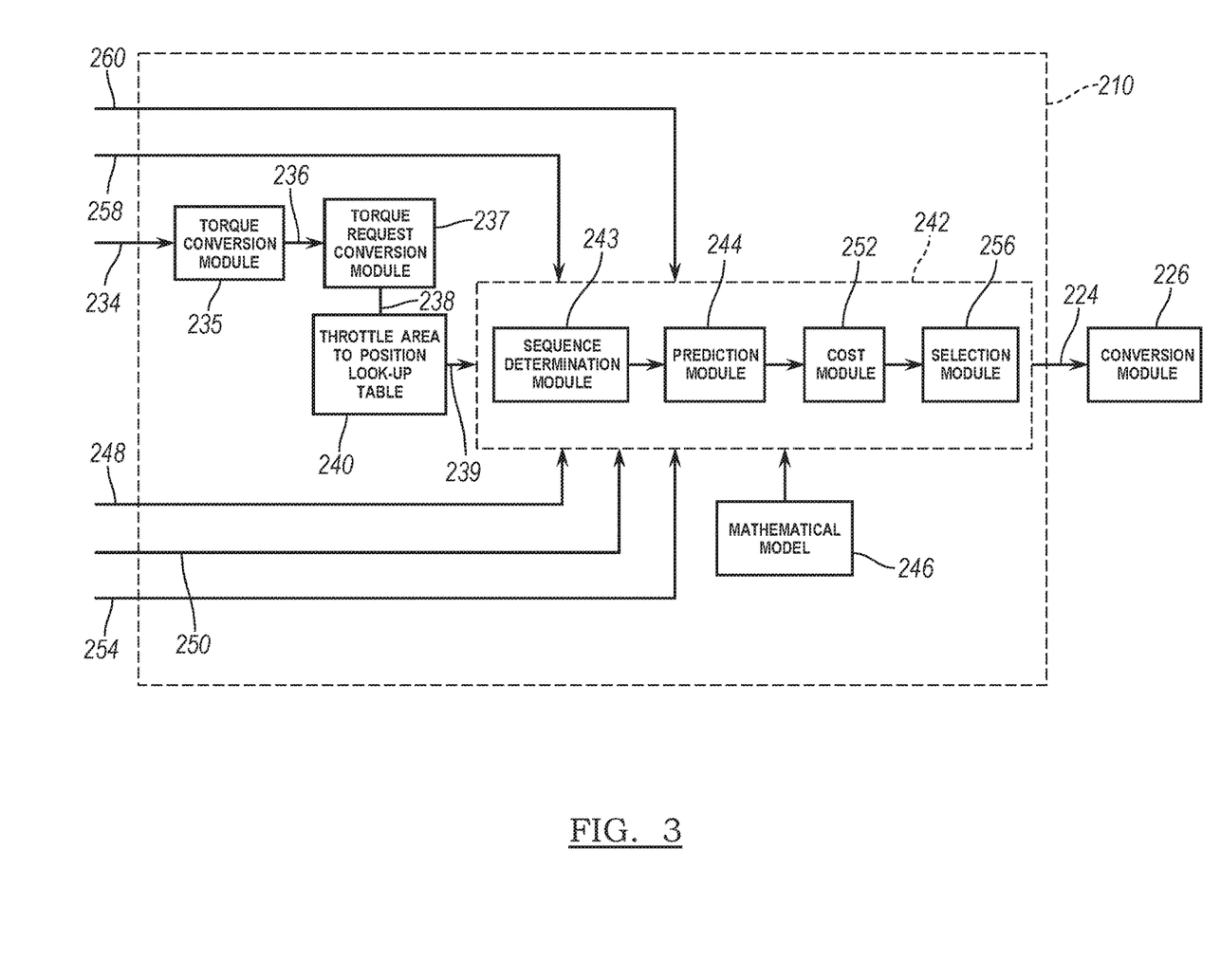
FIG. 3 is a functional block diagram of an air control module according to an exemplary embodiment.

The base air torque request 236 is then converted using a torque request conversion module 237 into a requested throttle area or throttle position request 238. The throttle position request 238 is then translated to a throttle position 239 using data in a calibrated throttle area-to-position lookup table 240. The high level ECM 114 then controls the throttle valve from the throttle position 239 using the throttle position sensors (TPS) 190 as a feedback.

The MPC (model predictive control) system includes an air control MPC module 242 that generates values of the target throttle position value 224. A sequence determination module 243 determines possible sequences of the values of the target value 224.

A prediction module 244 determines predicted responses of the electronic throttle valve 112 position to the possible sequences of the target values based respectively using a mathematical model 246 of the electronic throttle valve 112, exogenous inputs 248, and feedback inputs 250. More specifically, based on a possible sequence of the target values, the exogenous inputs 248, and the feedback inputs 250, by applying the mathematical model 246 the prediction module 244 generates a sequence of predicted electronic throttle positions. The mathematical model 246 may be, for example, a function or a mapping calibrated based on characteristics of the electronic throttle using information found in a throttle calibration table.

The exogenous inputs 248 may include parameters that are not directly affected by the throttle valve 112. For example, the exogenous inputs 248 may include engine speed, turbocharger inlet air pressure, IAT, and/or one or more other parameters. The feedback inputs 250 may include, for example, an electronic throttle position and/or one or more other suitable parameters. The feedback inputs 250 may be measured using sensors (e.g., the throttle position sensors 190) and/or estimated based on one or more other parameters.

A cost module 252 determines a cost value for each of the possible sequences of the target values 224 based on the predicted parameters determined for a possible sequence and output reference values 254. An example cost determination is discussed further below.

A selection module 256 selects one of the possible sequences of the target values 224 based on the costs of the possible sequences. For example, the selection module 256 may select one of the possible sequences having the lowest cost while satisfying multiple input or actuator constraints 258 and multiple output constraints 260. The constraints are affine and are provided as either 1) input constraints, 2) output constraints, or 3) delta constraints (reference constraints). Different constraints can also be applied to each of the MPC controllers discussed in reference to FIG. 4 to achieve different controller outputs, or one or more controllers can have no constraints applied. The constraints are saved in a memory in the software, and each can be either a calibratable value or can be hard-coded.

In various implementations, satisfaction of the actuator constraints 258 and the output constraints 260 may also be considered in the cost determination. In these implementations, the cost module 252 may determine the cost values further based on the actuator constraints 258 and the output constraints 260. As discussed further below, based on how the cost values are determined, the selection module 256 will select one of the possible sequences that best achieves the electronic throttle position while minimizing the cost, subject to the actuator constraints 258 and the output constraints 260. The various constraints are linear and can be changed in real time, are always available to the quadratic functions described below, and can be selected or de-selected by application of a qualifier which for example can be changed to an infinite value when a specific constraint is not desired.

During a subsequent or next control loop, the air control MPC module 242 identifies possible sequences, generates the predicted parameters for the possible sequences, determines the cost of each of the possible sequences, selects one of the possible sequences, and sets of the target throttle opening area or target value 224 to a first set in the selected possible sequence. This process continues for each control loop. The target throttle opening area or target value 224 is fed into the conversion module 226 as discussed in reference to FIG. 2.

With continuing reference to FIG. 2, an actuator constraint module 262 sets one of the actuator constraints 258 for each of the target values 224. Therefore the actuator constraint module 262 sets an actuator constraint for the throttle valve 112.

The actuator constraints 258 for each one of the target values 224 may include a maximum value for an associated target value and a minimum value for that target value. The actuator constraint module 262 may generally set the actuator constraints 258 to predetermined operational ranges for the throttle motor controllers. More specifically, the actuator constraint module 262 may set the actuator constraints 258 to predetermined operational ranges for the throttle valve 112. Sets of the throttle motor duty cycle values are identified based on a position of the throttle valve 112, and predicted future state values of a throttle motor system are determined for each of the sets of the throttle motor target duty cycle values 228 based on the throttle duty cycle values of each of the sets and a mathematical model of a throttle body 304 shown and described in reference to FIG. 5.

Under some circumstances the actuator constraint module 262 may also selectively adjust one or more electronic throttle position constraints. For example, the constraint module 262 may adjust the actuator constraints 258 to narrow an operational range for that electric motor control parameter when a fault is diagnosed in an electric motor 276 shown and described in reference to FIG. 4. In another example, the constraint module 262 may adjust the electric motor constraints such that the target value for a given actuator follows a predetermined schedule over time or changes by a predetermined amount, for example, for a fault diagnostic, such as an electric motor fault diagnostic, a throttle diagnostic, and the like. There are constraints for the high level MPC throttle control in terms of position, and there are also constraints for the low level MPC controller which is controlling valve position via valve duty cycle.

For a target value to follow a predetermined schedule over time or to change by a predetermined amount, the actuator constraint module 262 may also set the minimum and maximum values to a same value. The minimum and maximum values being set to the same value may force the corresponding target value to be set to the same value as the minimum and maximum values. The actuator constraint module 262 may also vary the same value to which the minimum and maximum values are set over time to cause the target value to follow a predetermined schedule.

With continuing reference to FIGS. 2 and 3, an output constraint module 264 sets the output constraints 260. The output constraint module 264 may generally set the output constraints 260 to predetermined ranges for the associated predicted parameters. However, the output constraint module 264 can also vary one or more of the output constraints 260 under some circumstances.

A reference module 266 (see FIG. 2) generates the output reference values 254 for the target values 224. The output reference values 254 include a reference for each of the target values 224. The output reference values 254 include a reference throttle opening area.

The reference module 266 may determine the output reference values 254, for example, based on the air torque request 234, the base air torque request 236, the corresponding throttle area, and the corresponding throttle position, and/or one or more other suitable parameters. The output reference values 254 provide references for setting the target values 224, respectively. The output reference values 254 may also be used to determine the cost values for possible sequences. The output reference values 254 may further be used for one or more other reasons, such as by the sequence determination module 243 to determine possible sequences.

The MPC module 242 determines the target values 224 using one or more quadratic programming (QP) problems (described in reference to FIG. 4), which may be for example Dantzig QP solvers. For example, the MPC module 242 may generate a surface of cost values for the possible sequences of the target values 224 and, based on the slope of the surface of cost values, identify a set of possible target values having the lowest cost. The MPC module 242 then tests that set of possible target values to determine if that set of possible target values satisfies the actuator constraints 258 and the output constraints 260. The MPC module 242 selects the set of possible target values having the lowest cost while satisfying the actuator constraints 258 and the output constraints 260.

The cost module 252 determines the cost for the possible sequences of the target values 224 based on relationships between the following: the predicted throttle position and the throttle position request 239; the possible target values and the respective actuator constraints 258; the other predicted parameters and the respective output constraints 260; and the possible target values and the respective output reference values 254. These relationships may be weighted to control the effect that each of the relationships has on the cost.

The cost module 252 may also determine the cost for a possible sequence of the target values 224 based on the following more detailed equation subject to the actuator constraints 258 and the output constraints 260:

$$\sum_{i=1}^{N} wT*\|TP_i - DTP\| + wD*\|\Delta DC_i\| + \rho\varepsilon^2$$

where Cost is the cost for the possible sequence of the target values 224, TP is the throttle position, DTP is the throttle position request 239, wT is a weighting value associated with the relationship between the predicted and reference throttle positions, ΔDC is the duty cycle increment, wD is the weight associated with the input increments, s is the slack variable for soft constraints and ρ is the weight associated to the slack variable.

Referring to FIG. 4 and again to FIGS. 1 through 3, the high level throttle actuator module 116 controls operation of the throttle valve 112. The throttle valve 112 includes a butterfly blade or throttle valve blade 268 which is fixed to a rotating shaft 270. Opposed biasing members 272 such as compression springs positioned about the shaft 270 and oppositely biased, bias the throttle valve blade 268 to a null or balance point, typically at or near approximately a 30% valve open position. The shaft 270 is connected to a gear box 274 which is driven by a DC electric motor 276. The DC electric motor 276 receives control commands from at least one and according to several aspects multiple model predictive controllers, including a first MPC controller 278, a second MPC controller 280, and as many additional controllers as desired, identified generally as an MPC controller 282.

Figure 4:
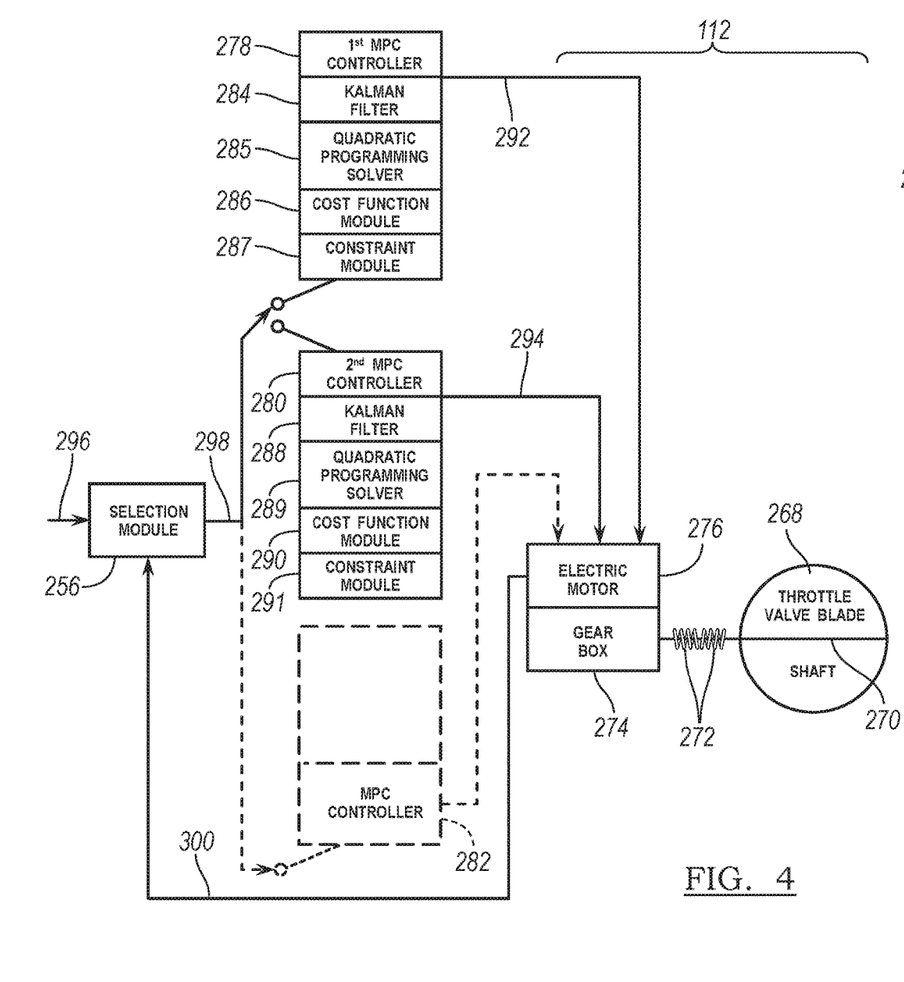
FIG. 4 is a functional block diagram of an MPC throttle motor control module according to an exemplary embodiment.

Each of the MPC controllers includes a Kalman filter and a quadratic programming (QP) problem which is solved by a QP solver. For example, the first MPC controller 278 includes a Kalman filter 284 which communicates with a QP solver 285, a cost function module 286 and a constraint module 287. Similarly, the second MPC controller 280 includes a Kalman filter 288 which communicates with a QP solver 289, a cost function module 290 and a constraint module 291. The first MPC controller 278 communicates with the electric motor 276 via a communication line 292 and the second MPC controller 280 communicates with the electric motor 276 via a communication line 294.

Kalman filters such as the Kalman filters 284, 288 allow linear motor control, and provide an estimate of the states of the mathematical models of the throttle system. When switching from one throttle position area region to another throttle position area region (for example when switching from the first MPC controller 278 to the second MPC controller 280, the Kalman filter state is updated using the last input to change from the old model state to the new model state, which smooths the state change. The quadratic programming solvers such as the (QP) solver 285 and the QP solver 289 provide quadratic functions that solve for a best fit of the predictive data at each step or progressive loop, and therefore help to identify when a different model or MPC controller provides a better fit or solution.

As previously discussed herein, based on how the cost values are determined, using an output 296 from the cost module 252 the selection module 256 selects one of the possible sequences that best achieves the electronic throttle valve blade 268 position while minimizing the cost, subject to the actuator constraints 258 and the output constraints 260. The selection module 256 then sets the target values 224 for the target throttle opening area or target value 224 by a throttle position desired control signal 298 directed for example to the first MPC controller 278. A feedback line 300 returns throttle position feedback signals from the throttle position sensors 190 to the selection module 256.

As previously noted, during each subsequent or next control loop, the MPC module 242 identifies possible sequences, generates the predicted parameters for the possible sequences, determines the cost of each of the possible sequences, selects one of the possible sequences, and may reset the target throttle opening area or target value 224 to another set of the target values 224 in the selected possible sequence, for example by directing the throttle position desired control signal 298 to the second MPC controller 280.

In this way, a predefined range, for example approximately 30 degrees of throttle valve operation, can be controlled by selecting an individual one of the MPC controllers 278, 280, or 282. The range of operation can also be predetermined to vary between each of the MPC controllers. For example, according to several aspects one of the MPC controllers such as the second MPC controller 280 can be used to control throttle valve position proximate to the balance point of the valve blade 268 which can be narrowed or expanded as desired, the first MPC controller 278 can be used to control throttle valve position on a first side of the balance point, and another one of the MPC controllers 282 can be used to control throttle valve position on an opposite side of the balance point with respect to the first MPC controller 278.

Referring to FIG. 5 and again to FIG. 4, the throttle valve blade 268 is positioned in a throttle passage 302 of a throttle body 304 and can rotate approximately 90 degrees between a valve closed position indicated at the position of throttle valve blade 268' to a valve open position indicated at the position of throttle valve blade 268". The throttle valve blade 268 rotates about an axis defined by the shaft 270. The throttle balance point can vary between different engine or throttle designs and is indicated at the position of throttle valve blade 268'". The target throttle position 224 is defined by the degree of opening rotation of the throttle valve blade 268. The opposed biasing members 272 positioned about the shaft 270 bias the throttle valve blade 268 to the null or balance point (indicated at throttle valve blade 268'") when not acted upon by the electric motor 276. Because the net biasing force of the biasing members 272 is minimal at the balance point, oscillation of the throttle valve blade 268 that could otherwise occur due to flow past the throttle valve blade 268 can be minimized by dedicating one of the MPC controllers to operation at or near the balance point, for example within approximately +−10 degrees of the balance point.

Figure 5:
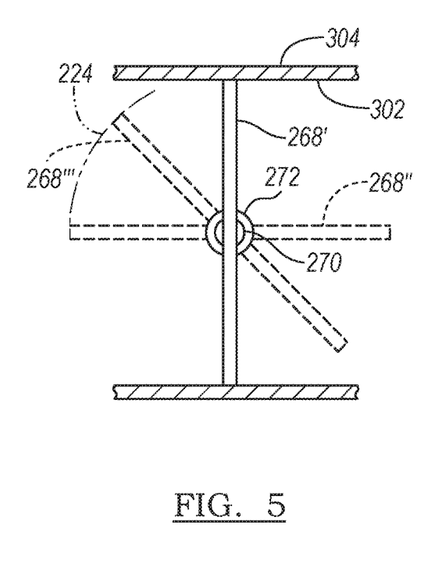
FIG. 5 is a partial cross sectional elevational view of a throttle valve body according to an exemplary embodiment.
Figure 6:
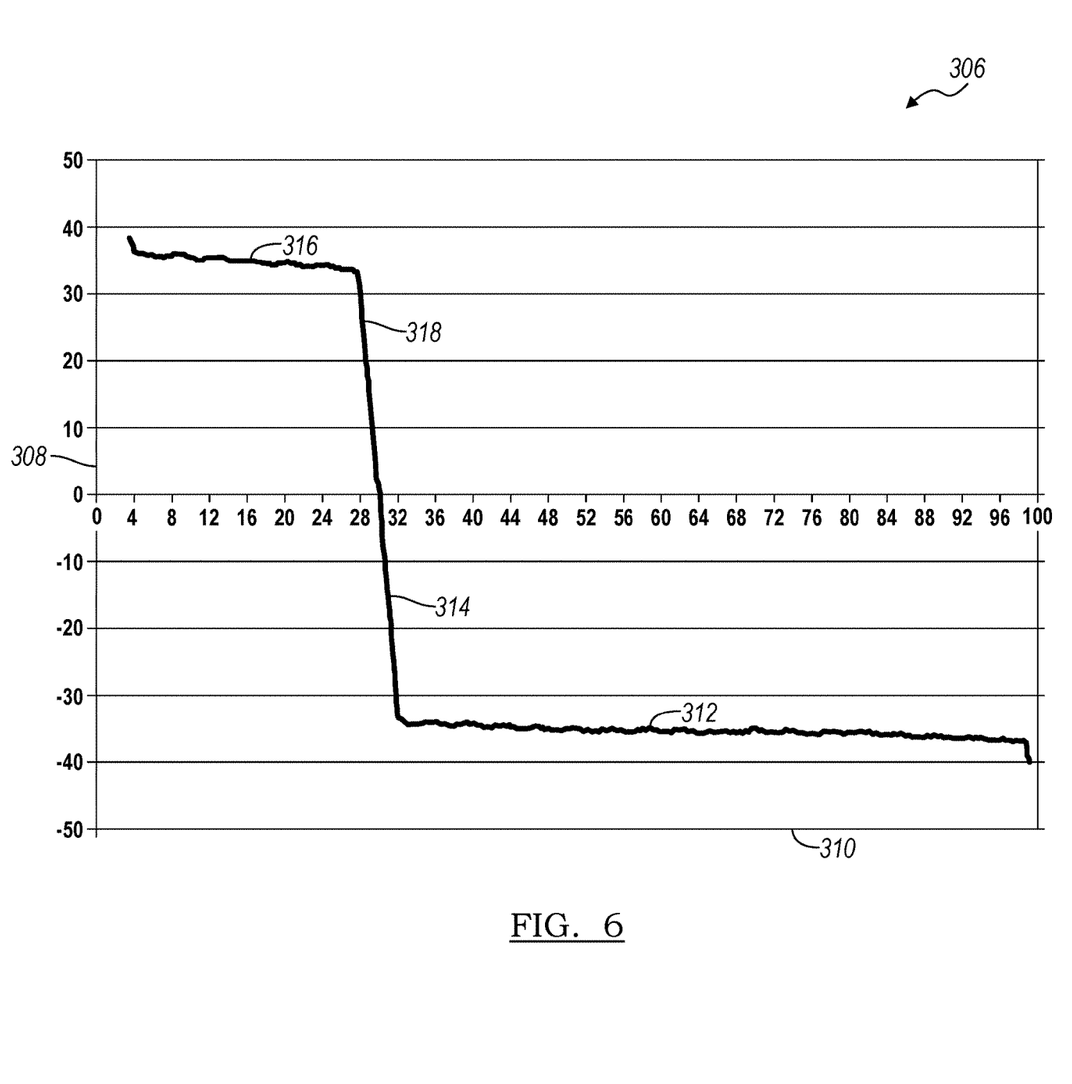
FIG. 6 is a graph presenting non-linear torque characteristics of an exemplary throttle body.

Referring to FIG. 6 and again to FIG. 5, a graph 306 presents a throttle blade shaft torque range 308 (in N-cm) compared to a rotation angle 310 (in degrees) for an exemplary throttle body. An average torque 312 is substantially linear above a rotation angle of approximately 32 degrees, and is substantially non-linear between approximately 30 to 32 degrees. Similarly, an average torque 316 is substantially linear below a rotation angle of approximately 28 degrees, and is substantially non-linear between approximately 28 to 30 degrees. In this example the throttle valve is therefore harder to control in a linear manner near the balance point of approximately 30 degrees. Graphs such as the graph 306 for multiple different throttle valves can therefore be used to identify the most effective rotational angle ranges proximate to the balance point of the valves for use of a dedicated MPC controller of the present disclosure.

The methods and systems providing for throttle control using model predictive control of the present disclosure offer several advantages. These include increased accuracy of throttle valve position compared to single PID controlled throttle valve positioning, increasing the accuracy of torque control. Unintended throttle and torque oscillations are reduced or eliminated. The occurrence of diagnostic trouble codes resulting from throttle valve oscillation or poor control are also reduced. System calibration time is also reduced because the models applying model predictive control can incorporate a larger set of throttle valve operational data and operating conditions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A throttle control system for a vehicle, comprising:
a throttle valve connected to and actuated by an electric motor, the throttle valve having a non-linear response over an operating range having multiple different regions;
multiple controllers in communication with the electric motor and programmed to actuate the electric motor and thereby to control the throttle valve, each of the controllers assigned to one of the multiple different regions of the operating range;
an electronic control circuit in communication with the electric motor of the throttle valve programmed to vary an amount of fuel provided to individual cylinders of an engine based on a torque request signal, the electronic control circuit generating multiple target values for a throttle position of the throttle valve to generate a target electronic throttle position for each of the regions of the operating range; and
a selection circuit in communication with the electronic control circuit programmed to select one of multiple possible sequences of the multiple target values based on a cost of each of the possible sequences and programmed to select one of the multiple controllers to control the electric motor of the throttle valve in one of the different regions based on the cost.

2. The throttle control system for a vehicle of claim 1, wherein:
the multiple controllers include at least a first controller and a second controller, the selection circuit programmed to select one of the first controller or the second controller based on a current operating position of the throttle valve; and
at least one of the first controller or the second controller configures configured to control operation of a throttle valve motor duty cycle of the electric motor to achieve the target electronic throttle position based on a first one of multiple control action values.

3. The throttle control system for a vehicle of claim 2, further including a prediction circuit in communication with the selection circuit, wherein sets of throttle motor duty cycle values identified based on a position of the throttle valve and predicted future state values determined by the prediction circuit are assigned for each of the sets of the throttle motor target duty cycle values based on the current operating position of the throttle valve.

4. The throttle control system for a vehicle of claim 3, wherein the future state values are further based on a throttle body temperature.

5. The throttle control system for a vehicle of claim 4, wherein the future state values are further based on a throttle voltage, with both the throttle body temperature and the throttle voltage defining measured disturbances.

6. The throttle control system for a vehicle of claim 5, further including a constraint circuit in communication with the electronic control circuit programmed to set multiple input, output and reference constraints for each of an output throttle position, a throttle motor input duty cycle and a throttle motor input duty cycle rate change.

7. The throttle control system for a vehicle of claim 1, wherein the selection circuit is programmed to set target values for a target throttle opening area by a throttle position desired control signal directed to one of the multiple controllers.

8. The throttle control system for a vehicle of claim 1, wherein each of the multiple controllers includes a Kalman filter providing linear control of the electric motor and providing an estimate of a state of the throttle control system.

9. The throttle control system for a vehicle of claim 8, wherein each of the multiple controllers includes a quadratic programming problem solver programmed to solve quadratic functions that solve for a best fit of predictive data and identify when a different one of the multiple controllers provides a better fit or solution for positioning the throttle valve; and wherein the quadratic programming problem solver is different for each of the multiple controllers.

10. The throttle control system for a vehicle of claim 8, wherein switching from one throttle position region of the operating range to another throttle position region of the operating range is performed by switching from a first one of the multiple controllers to a second one of the multiple controllers, and a Kalman filter state is updated using a last input to change from an old model state to a new model state to smooth the state change.

11. The throttle control system for a vehicle of claim 1, wherein the at least one controller includes:
    a first controller assigned to control the throttle valve at a throttle balance point of the throttle valve, the throttle balance point defined as a predetermined percentage of a throttle valve open position; and
    a second controller assigned to control the throttle valve when the throttle valve is positioned away from the throttle balance point.

12. The throttle control system for a vehicle of claim 1, further including a high level throttle actuator programmed to regulate opening of the throttle valve to control an amount of air drawn into an intake manifold.

13. The throttle control system for a vehicle of claim 12, wherein the high level throttle actuator is further programmed to monitor a position of the throttle valve using at least one throttle position sensor.

14. A throttle control system for a vehicle, comprising:
    multiple circuits operating a throttle valve, including:
        a conversion circuit programmed to receive signals defining a desired torque of the throttle valve and convert the desired torque to a desired throttle area and to further convert the desired throttle area to a target throttle position;
        a selection circuit connected to the conversion circuit programmed to select one of multiple controllers to energize based on a current position of the throttle valve;
        a prediction circuit connected to the conversion circuit and the selection circuit programmed to predict future state values using a model of a throttle body of the throttle valve;
        a cost circuit connected to the prediction circuit programmed to determine a first cost for a first possible set of target throttle duty cycle values; and
        a control circuit in communication with the conversion circuit programmed to identify sets of target throttle motor duty cycle values for each of the multiple controllers;
    wherein each of the multiple controllers control operation of a throttle valve duty cycle to achieve a target throttle opening area of the throttle valve based on one of the target throttle motor duty cycle values.

15. The throttle control system for a vehicle of claim 14, wherein the target throttle opening area is reset by changing to a different one of the sets of target throttle motor duty cycle values by directing a throttle position desired control signal to one of the multiple controllers different than the selected one of multiple controllers.

16. The throttle control system for a vehicle of claim 14, wherein the multiple controllers include a first controller actuated to control throttle valve position at a balance point of a valve blade of the throttle valve, a second controller actuated to control throttle valve position on a first side of the balance point, and a third controller actuated to control throttle valve position on an opposite side of the balance point with respect to the second controller.

\* \* \* \* \*